(12) United States Patent
Hirmer et al.

(10) Patent No.: US 6,270,146 B1
(45) Date of Patent: Aug. 7, 2001

(54) INSERT MOLDED FRAME AND GLAZING ASSEMBLY AND METHOD FOR MAKING THE SAME

(75) Inventors: Gerhard F. Hirmer, Aurora; Lassi M. Ojanen, Richmond Hill, both of (CA)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 09/124,922

(22) Filed: Jul. 29, 1998

Related U.S. Application Data
(60) Provisional application No. 60/054,393, filed on Jul. 31, 1997.

(51) Int. Cl.[7] .................................................. B60J 7/08
(52) U.S. Cl. .............. 296/146.14; 296/145; 296/107.07; 264/511
(58) Field of Search ................ 296/146.14, 146.15, 296/107.17, 145, 201, 96.21; 264/510, 511

(56) References Cited

U.S. PATENT DOCUMENTS

| | | |
|---|---|---|
| 4,572,570 | 2/1986 | Trucco . |
| 5,460,424 | 10/1995 | Wagner . |
| 5,464,265 | 11/1995 | Hemmis et al. . |
| 5,558,390 | 9/1996 | Hemmis et al. . |
| 5,560,671 * | 10/1996 | Ojanen et al. .................. 296/146.14 |
| 6,015,181 * | 1/2000 | Exner .................................. 296/145 |
| 6,082,807 * | 7/2000 | Hartmann et al. .............. 296/107.07 |

FOREIGN PATENT DOCUMENTS

| | | |
|---|---|---|
| 38 35 292 A1 | 4/1990 | (DE) . |
| 42 40 281 A1 | 4/1994 | (DE) . |
| 0 561 323 A1 | 3/1993 | (EP) . |

* cited by examiner

Primary Examiner—Joseph D. Pape
(74) Attorney, Agent, or Firm—Pillsbury Winthrop LLP

(57) ABSTRACT

A backlight assembly for a convertible roof of a vehicle has a fabric roof cover having a backlight opening formed therein and a plurality of apertures formed therein about a periphery of the backlight opening. A glazing is disposed in the backlight opening. The glazing has a flange extending about a periphery thereof which overlaps a portion of the fabric roof cover. The flange has a plurality of fastener-receiving structures, each of which are received within a corresponding one of the plurality of apertures in the roof cover. A first frame member extends about a periphery of the glazing and overlaps the flange and sealingly engages the roof cover. A second frame member extends about periphery of the glazing and overlaps the flange. The second frame member is disposed opposite the first frame member with the flange and the roof cover disposed therebetween. The second frame member has a plurality of fasteners, each interlocking with a corresponding one of the fastener-receiving structures to fasten the second frame member to the flange to thereby secure the glazing to the roof cover.

18 Claims, 4 Drawing Sheets

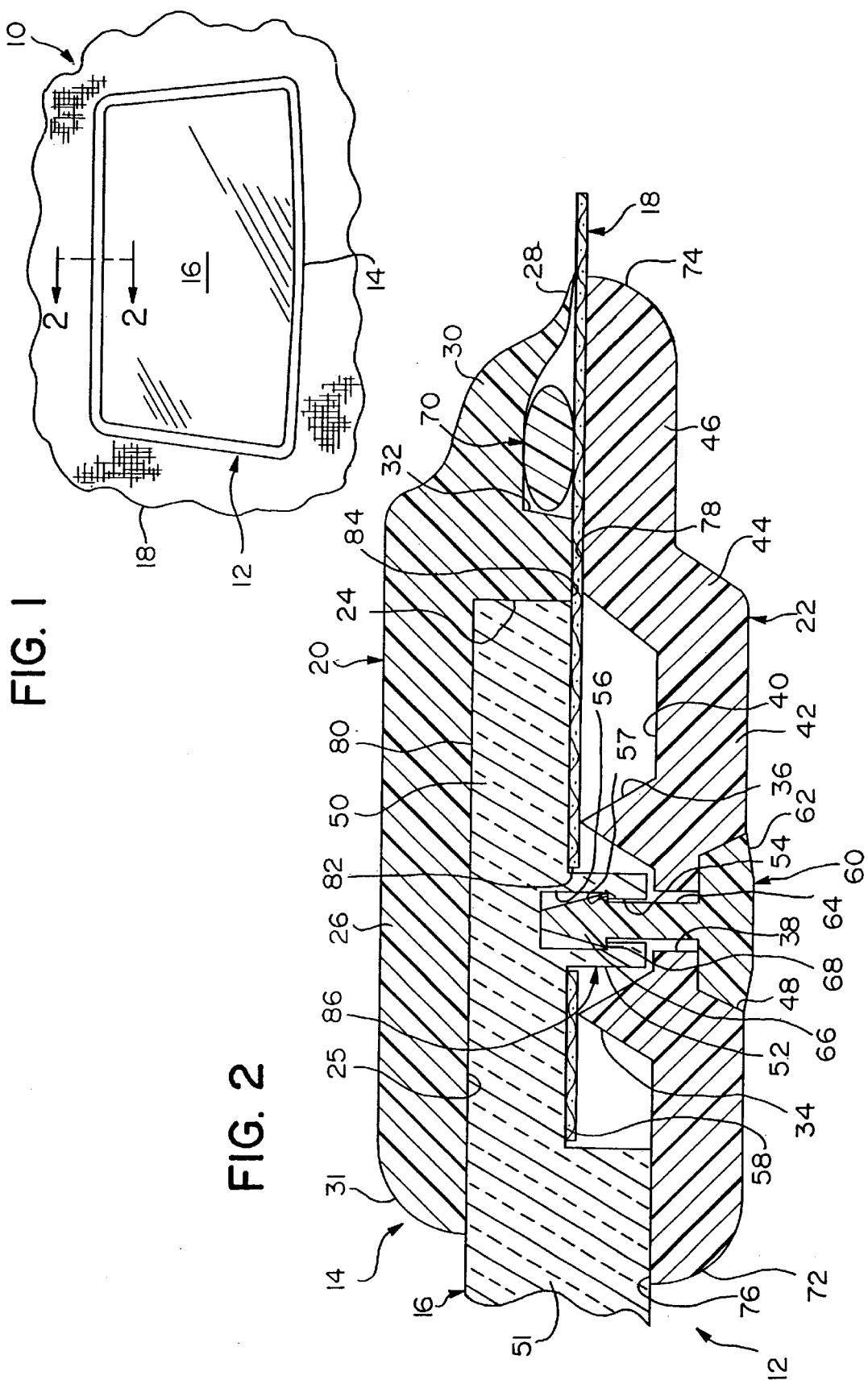

INSERT MOLDED FRAME AND GLAZING ASSEMBLY AND METHOD FOR MAKING THE SAME

This application claims the benefit of Provisional Application No. 60/054,393 filed Jul. 31, 1997.

FIELD OF THE INVENTION

This invention relates to an insert molded frame and glazing assembly, and more particularly, to an insert molded frame and glazing assembly for use as a backlight, or rear window, of a convertible roof top for an automobile and a method for making the same.

BACKGROUND OF THE INVENTION

In conventional convertible roof tops for automobiles, the roof is made primarily of a fabric material with a clear vinyl panel employed as a backlight. The vinyl panel is attached around its periphery to an opening in the fabric roof top so as to be substantially permanently attached to the fabric. The permanent attachment of the vinyl panel to the fabric roof makes it virtually impossible to replace only the vinyl panel should it become weathered or torn. To replace a weathered or torn vinyl backlight, it is often necessary to replace the entire soft portion of the convertible roof top.

Rigid glass panels have also been employed in convertible roof tops because they are more resistant to weathering and are not prone to tearing. Because such panels are rigid, however, they do not neatly fold into a small package for stowing and are further susceptible to cracking or shattering.

Accordingly, the need exists for a soft, flexible backlight for a convertible roof top which may be separately removed from the fabric portion of the roof top yet is securely fixed at its perimeter to the backlight opening in a weather-tight fashion.

SUMMARY OF THE INVENTION

The disadvantages of the prior art may be overcome by providing a backlight assembly for a convertible roof of a vehicle. The assembly comprises a fabric roof cover having a backlight opening formed therein and a plurality of apertures formed therein about a periphery of the backlight opening. A glazing is disposed in the backlight opening. The glazing has a flange extending about a periphery thereof which overlaps a portion of the fabric roof cover. The flange has a plurality of fastener-receiving structures, each of which are received within a corresponding one of the plurality of apertures in the roof cover. A first frame member extends about a periphery of the glazing and overlaps the flange and sealingly engages the roof cover. A second frame member extends about periphery of the glazing and overlaps the flange. The second frame member is disposed opposite the first frame member with the flange and the roof cover disposed therebetween. The second frame member has a plurality of fasteners, each interlocking with a corresponding one of the fastener-receiving structures to fasten the second frame member to the flange to thereby secure the glazing to the roof cover.

It is desirable to provide a method for securing a backlight glazing into a backlight opening formed in a fabric cover of a convertible roof of a vehicle. The method comprises the steps of:

providing a fabric cover with a backlight opening and a plurality of apertures extending about a periphery of the backlight opening;

providing a glazing having a plurality of fastener-receiving structures formed about a flange extending from a periphery of the glazing, the plurality of fastener-receiving structures being constructed and arranged to permit each of the fastener-receiving structures to be received within a corresponding one of the apertures in the roof cover when the glazing is inserted through the backlight opening;

forming a first frame member secured to the periphery of the glazing and overlapping the flange by placing the periphery and flange of the glazing into a cavity of a mold assembly and injecting flowable molding material into the cavity and permitting the molding material to be molded directly to the periphery and flange of the glazing to form a first frame member;

positioning the glazing and the first frame member with respect to the backlight opening so that each of the fastener-receiving structures is received within a corresponding one of the apertures, the flange overlapping a portion of the fabric cover;

providing a second frame member and positioning the second frame member opposite the first frame member with the overlapping portions of the flange and the fabric cover disposed between the first and second frame members and fastening the second frame member to the fastener-receiving structures, sandwiching the fabric between the flange and the second frame member thereby securing the glazing to the fabric cover.

BRIEF DESCRIPTION OF THE DRAWINGS

In drawing which illustrate embodiments of the present invention,

FIG. 1 is a partial plan view of a convertible roof top backlight;

FIG. 2 is a cross-sectional view of a frame and glazing assembly according to a first embodiment of the present invention taken along the line A—A in FIG. 1;

DETAILED DESCRIPTION OF THE PREFERRED EMBODIMENTS

Figure 3:
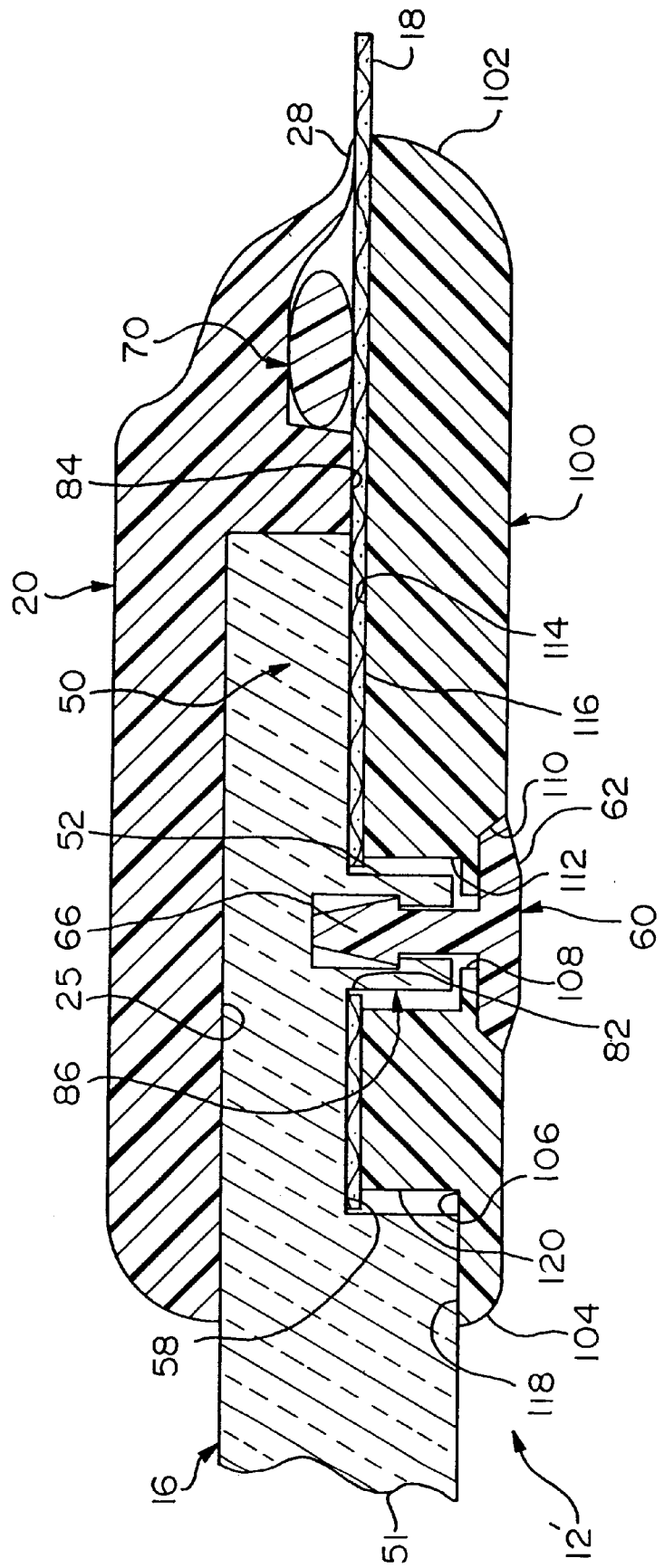
FIG. 3 is a cross-sectional view of a frame and glazing assembly according to a second embodiment of the present invention taken along the line A—A in FIG. 1.

A convertible roof backlight, generally indicated at reference number 10, is shown in FIG. 1. The roof 10 comprises a fabric portion 18 having a backlight opening formed therein within which is secured a frame and glazing assembly 12. The glazing 16 preferably comprises a panel of flexible polycarbonate material. Surrounding the glazing panel 16 and securing the glazing to the fabric 18 is a peripheral frame 14 extending continuously around the glazing panel 16.

A first embodiment of the frame and glazing assembly 12 is shown in FIG. 2. The frame 14 comprises a first frame member 20 and a second frame member 22. First and second frame members 20 and 22 preferably extend continuously around the periphery of the glazing 16 and are preferably formed by injection molding a thermoplastic material, preferably a polycarbonate blend such as ASA or PMMA. In the preferred embodiment, first frame member 20 is an exterior frame and second frame member 22 is an interior frame.

First frame member 20 preferably includes a section 26 which is substantially coplanar with the glazing 16, a rounded edge 31 on the glazing side of the frame member, and a sloping portion 30 on the fabric side of the frame member. Sloping portion 30 terminates in a flexible lip 28. The underside of the frame member has a planar surface 25 which is substantially coplanar with the glazing 16 and an inner edge 24 which is substantially perpendicular to the planar surface 25 and extends at a right angle therefrom. Planar surface 25 and inner edge 24 define an interior shelf for receiving a peripheral edge of the glazing panel 16.

A sealant groove 32 is also preferably formed on the underside of the first frame member 20 below sloping section 30 and also extends around the entire periphery of the frame 14.

The glazing panel 16 comprises a central portion 51 typically having a thickness between 3.5 and 6 millimeters and a peripheral flange 50 having a reduced thickness as compared to the central portion 51. The thickness of flange 50 of the glazing 16 is the same as the height of the inner edge 24 of the first frame member 20.

The first frame member 20 is preferably formed by an injection molding process wherein the glazing 16 is inserted into the injection mold and the first frame member is molded into the glazing 16 so as to create a bond line 80 between the first frame member 20 and the glazing 16 at the interfaces of the planar surface 25 and the inner edge 24 with the peripheral edge of the glazing 16.

Second frame member 22 includes a first section 42 that is substantially coplanar with the glazing 16, an angled section 44, and a second section 46. The first section 42, angled section 44, and second section 46 define an inner open area 40, the height of the inner open area 40 being slightly less than the difference in the thickness between the central portion 51 and the flange 50 of the glazing 16. Second frame member 22 preferably has glazing-side and fabric-side rounded edges 72, 74.

Defined within the inner open space 40 are first and second knife edges 34, 36 extending into the open space 40 and having a height approximately the same as that of the open space 40. Knife edges 34 and 36 are preferably continuous, extending about the entire periphery of the frame 14, but may also be discontinuous, i.e. being in the form of discrete spikes or cleats.

An aperture 38 extending through the first section 42 of the second frame member 22 is preferably provided between the first knife edge 34 and the second knife edge 36. Aperture 38 has a countersink 48.

The glazing 16 is formed with a plurality of fastener receiving structures 86 formed about its periphery and extending from the flange 50. As can be appreciated from FIG. 2, the height of the fastener receiving structure 86 is preferably the same as the difference between the thickness of the central portion 51 and the thickness of the flange 50 of the glazing 16. The fastener receiving structures 86 are spaced about the periphery of the glazing 16 with a spacing determined by the particular application and/or the expected localized loads in that area of the perimeter.

The fastener receiving structures 86 each include a raised boss portion 52, which is preferably cylindrical in shape. An insert aperture 54 is provided in the center of the boss portion 52 and extends into the boss portion 52 and is coaxial therewith. An inner chamber 56 is defined within the boss portion 52 and communicates with the insert aperture 54. The diameter of the inner chamber 56 is greater than that of the insert aperture 54, thus defining an annular, inwardly facing shoulder 57 at the interface of the insert aperture 54 and the inner chamber 56.

The frame and glazing assembly 14 is assembled as follows. The sealant groove 32 is filled with a suitable sealant material 70, which may be any flowable elastomeric material, preferably urethane. The sealant 70 provides bonding of the first frame member 20 with the fabric 18 and further provides sealing therebetween. The fabric 18 has apertures 82 corresponding in size and spacing to the fastener receiving structures 86 of the glazing 16. The fabric 18 is positioned on the inner surface of the first frame member 20 and glazing 16 assembly with the fastener receiving structures 86 protruding through the corresponding apertures 82. The fabric 18 is supported on an inwardly facing surface 58 of the flange 50 of the glazing 16 and also on a support surface 84 of the first frame member 20.

The second frame member is positioned against the fabric 18 and glazing 16 on the opposite side as the first frame member 20. Aperture 38 of the second frame member 22 is aligned with the insert aperture 54 of the fastener retaining structure 86. Surface 76 of the second frame member 22 bears against a portion of the glazing 16, thus sandwiching the glazing 16 between surface 76 and surface 25 of the first frame member 20. Fabric 18 is also sandwiched between surface 78 of the second frame member 22 and surface 84, sealant 70, and flexible lip 28, which deflects upwardly when the second frame member 22 is pressed against the first frame member 20. The elastically deflected lip 28 biased toward an undeflected position provides an improved seal between first frame member 20 and fabric 18.

Second frame member 22 is secured to the first frame member 20 by frame fasteners 60 having a head portion 62 and a shank portion 64. When installed, head portion 62 is seated within counter sink 48. Fastener 60 has an enlarged tip portion 66 having a frusto-conical shape which permits the enlarged tip to be inserted through the insert aperture 54 and into the inner chamber 56 of the boss 52 of the fastener receiving structure 86. It can be appreciated that the frusto-conical surface of the enlarged tip 66 causes the insert aperture 54 to expand, thus permitting the enlarged head to pass therethrough. An annular shoulder 68 is defined between the interface of the shank 64 and the enlarged tip 66. Shoulder 68 engages the shoulder 57 of the fastener receiving structure 86, thus resisting extraction of the fastener 60 from the fastener receiving structure 86. Frame fastener 60 is preferably formed of a suitable thermoplastic material including polycarbonate blends such as ASA and PMMA.

As can be appreciated from FIG. 2, with the fastener 60 inserted into the fastener receiving structure 86, the glazing 16 and fabric 18 are sandwiched between the first frame member 20 and the second frame member 22. The knife edges 34 and 36 press into the fabric 18 and glazing 16 to tightly hold the fabric 18 in the frame and glazing assembly 12 and limit the bearing forces imposed on the aperture 82 of the fabric 18.

A second embodiment of the frame and glazing assembly is represented generally by a reference number 12' in FIG. 3. In FIG. 3, components and features in the framing and glazing assembly that are the same as those shown in FIG. 2 are given identical reference numbers as shown in FIG. 2.

In the second embodiment of the frame and glazing assembly 12', second frame member 100 includes a first planar surface 114 that is substantially parallel to the glazing 16 and fabric 18 with rounded ends 102 and 104. At the glazing end of the second frame member 100, a notch portion 106 is provided. Notch 106 defines a second planar surface 118 that is substantially parallel to first planar surface 114 and an inner edge 120 that is substantially perpendicular to planar surface 118. The height of inner edge 120 is slightly less than the difference between the thickness of the glazing 16 at section 51 and the thickness of the glazing 16 at flange 50.

In the second embodiment of the frame and glazing assembly 12', the glazing 16 and first frame member 20 are physically the same as the like structures in the first embodiment shown in FIG. 2.

Second framing member 100 is preferably formed of a suitable thermoplastic material including polycarbonate blends such as ASA and PMMA. Second frame member 100 includes a plurality of insert apertures 108, associated counter sinks 110, and openings 112, preferably cylindrical in shape and coaxial with aperture 108, spaced about the peripheral extent of second frame member 100.

Second frame member 100 is preferably formed by injecting molding, with the fabric 18 inserted into the mold so that the perimeter of the backlight opening of the fabric extends into the injection mold. The second frame member 100 is then injection molded onto the backlight opening perimeter so as to form a bond line 116 between the second framing member 100 and the fabric 18.

The frame and glazing assembly 12' is assembled by placing the second frame member 100 on the opposite side of the glazing 16 and fabric 18 from the first framing member 20 with the boss portions 52 of the fastener receiving structures 86 being received into the openings 112 formed in the second frame member 100. The glazing 16 is sandwiched between surface 118 of the second framing member 100 and surface 25 of the first framing member 20, and the fabric 18 is sandwiched between surface 114 of the second frame member 100 and bearing surface 58 of the glazing 16, bearing surface 84 of the first frame member 20, sealant 70, and lip 28 of the first framing member 20.

Second framing member 100 is held in place by inserting a fastener 60 through aperture 108 and into the fastener receiving structure 86 of the glazing 16 in a snap fit. Again, the fastener head 62 of the fastener 60 is seated within the counter sink 110 of the second frame member 100, and an enlarged tip portion 66 retains the fastener 60 within the fastener receiving structure 86.

Figure 4:
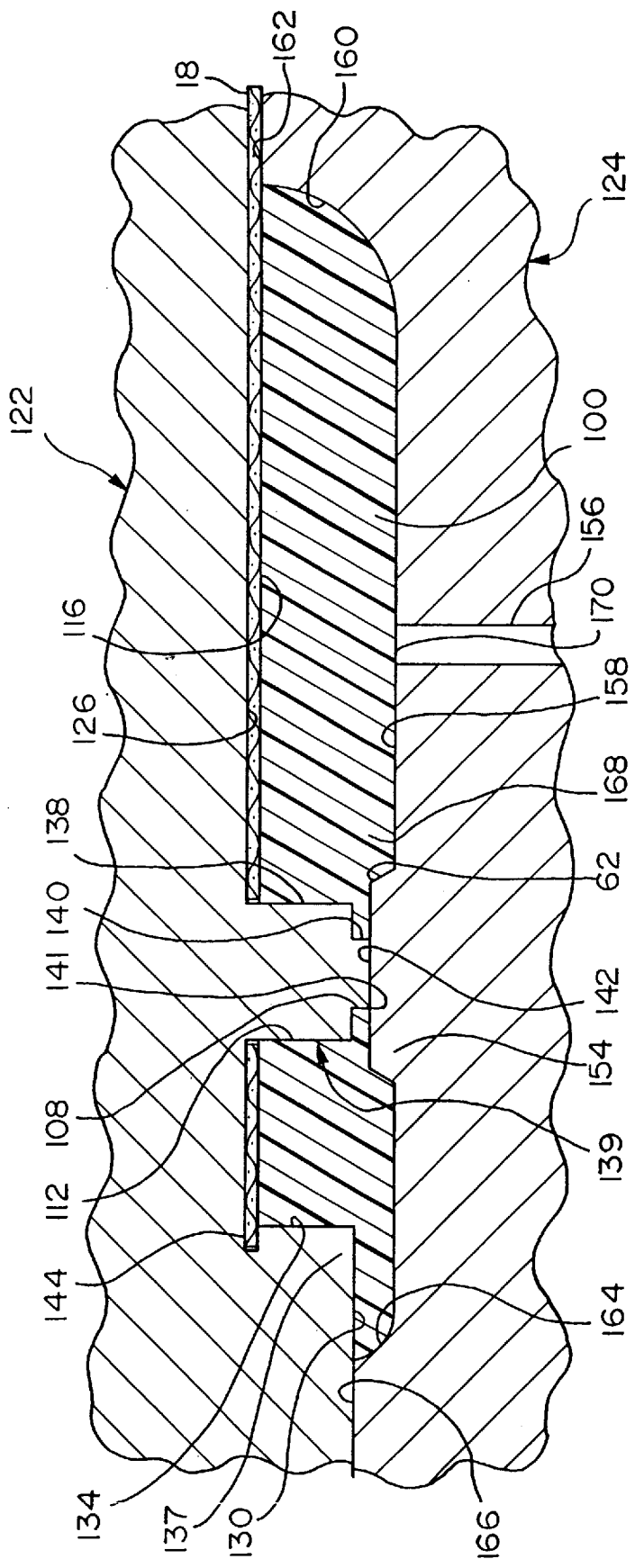
FIG. 4 is a partial cross-sectional view of an injection mold assembly for forming one part of the frame and glazing assembly of the present invention.

As illustrated in FIG. 4, a process for forming second frame member 100 of the embodiment illustrated in FIG. 3, preferably by injection molding, is illustrated. The process includes a mold, preferably made of metal, having a first part 122, and a second part 124. First and second mold parts 122 and 124 cooperate to define a continuous peripheral molding cavity.

First mold part 122 includes a molding surface defined by an inner surface 126 having a plurality of inwardly extending hole forming portions 139, an edge surface 134 defining generally a right angle with inner surface 126, and a surface 130 extending from edge surface 134 in a generally parallel orientation with respect to inner surface 126. Intersecting surfaces 134 and 130 form an outwardly facing shoulder potion 137 that dimensionally is the difference between the thickness of glazing panel central portion 51 and peripheral flange 50 of glazing 16.

The hole forming portions 139, extending inwardly from inner surface 126 of first mold part 122, are preferably cylindrically shaped and each defines a larger cylindrical section 138 and a smaller cylindrical section 140. The larger cylindrical section 138 is diametrically sized to form opening 112 of frame member 100 (see FIG. 3) preferably having a depth equal to that of edge surface 134. The number and orientation of hole forming portions 139 correspond to the plurality of fastener receiving structures 86, spaced about the periphery of the glazing 16.

Smaller cylindrical section 140 extends axially from each of the larger cylindrical sections 138 having a smaller diameter that corresponds to aperture 108 of second frame member 100 (see FIG. 3). The smaller cylindrical section 140 extends inwardly and communicates with an inner surface 142 of the second mold part 124. At the intersecting portion of inner surfaces 126 and 134, first mold part 122 may include a groove 144 which extends laterally from inner surface 126, thereby allowing the fabric 18 to slidingly enter thereinto.

Second mold part 124 includes a mold surface defined by an inner surface 158, a first arcuate inner surface 160, and a second inner arcuate surface 164. Inner surface 158 is generally parallel with inner surface 126 of first mold part 122. A plurality of inwardly extending frusto-conical portions 154 extend from inner surface 158. Frusto-conical portions 154 are axially aligned with the hole forming portions 139 of the first mold part 122 and are sized to form the counter-sunk portions 110 of second frame member 100. A plurality of injection gates 156 are provided about the periphery of the mold assembly. In the illustrated embodiment, injection gate 156 extends through second mold part 124. It will be understood that injection gates could be provided in either or both the first mold part 122 and second mold part 124.

The first mold part 122 cooperates with the second mold part 124 to define a mold cavity 168 which is substantially the same size and shape as frame member 100. More specifically, when first mold part 122 is placed into proper orientation with second mold part 124, inner surface 166 of second mold part 124 engages surface 130 of first mold part 122, and inner surface 126 of first mold part 122 and surface 162 of second mold part 124 sandwich the fabric 18 therebetween on the fabric side. An inwardly facing circular surface 141 of the smaller cylindrical portion 140 engages with the inner surface 142 of the frusto-conical portion 154.

Injection gate 156 in the second mold part 124 provides a means to inject molding material into the mold cavity 168 thereby forming frame member 100. It can be appreciated that a number of injection gates would extend into mold cavity 168 around the periphery of the second mold part 124 and/or the first mold part 122 in order to ensure that mold cavity 168 is completely filled and properly evacuated during the forming process such that frame member 100 is solidly and completely formed.

Second frame member 100 is preferably formed by injection molding of any suitable thermoplastic material including polycarbonate blends such ASA or PMMA.

Fabric 18 is inserted into the mold with hole forming portions 139 of the first mold 122 extending through fabric apertures 82. The fabric thusly lays flat against the inner surface 126. Second mold part 124 is then placed onto the first mold part 122 and resin material 170 is injected through injection gates 156 into the mold cavity 168 thereby forming frame member 100. Additionally, the molten thermoplastic material adheres to the fabric in the mold thus creating a bond line 116 between framing member 100 and fabric 18.

Figure 5:
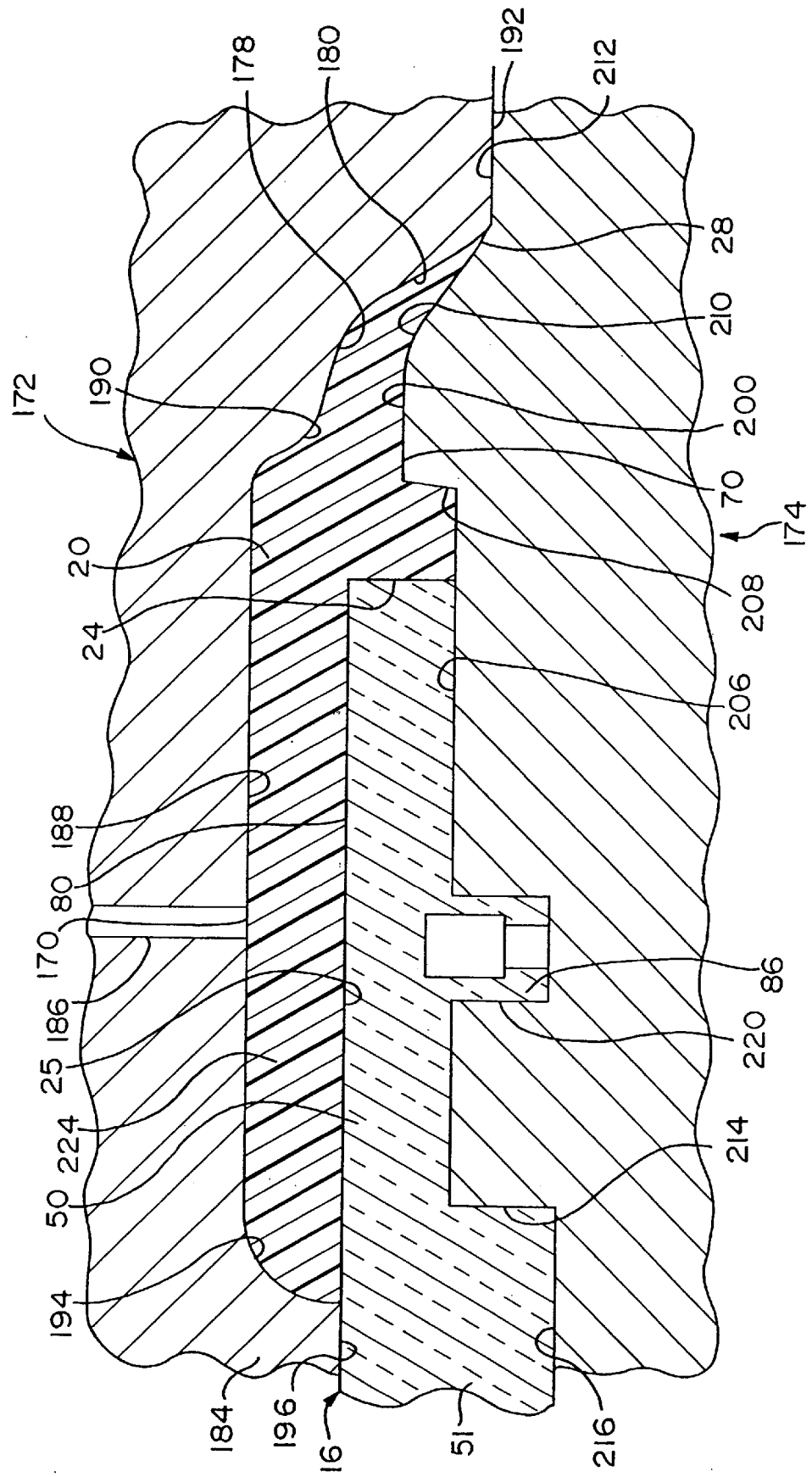
FIG. 5 is a partial cross-sectional view of an injection mold assembly for forming one part of the frame and glazing assembly of the present invention.

As illustrated in FIG. 5, a process for forming the top frame member 20, preferably by injection molding, is illustrated. The process is substantially the same as for molding frame member 100 and includes a mold, preferably made of metal, comprising a first mold part 172 and second mold part 174.

First mold part 172 includes a molding surface defined by a surface 188 that extends into an inwardly sloped convex surface 190 which extends into an inwardly sloped concave surface 178 and finally into an inwardly sloped surface 180. The sloping surface 180 continues until it terminates at a second surface 192. The inner surface 188 extends arcuately inward forming a rounded inner surface 194 which intersects with a surface 196 on the glazing side. Preferably located in a central portion of the first mold part 172 is one or more injection gates 186 extending therethrough.

Second mold part 174 includes a molding surface defined by an inner surface 206 which intersects an inwardly formed surface 208 having a height that conforms to the size of sealed groove 70 on the fabric side. Extending from surface 208 is a first portion 200 generally parallel to surface 206 and a sloping surface 210 that terminates at the end of sloping surface 180 of first mold part 172 thereby defining the form of flexible lip 28 of frame member 20. Extending on the fabric side is a second surface 212 that is substantially coplanar with second surface 192 of first mold part 172.

On the glazing side, inner surface 206 ends at edge surface 214 that extends at a right angle therefrom and intersects surface 216. The height of edge surface 214 corresponds to the difference in thickness between the glazing panel central portion 51 and flange 50 of glazing 16.

A plurality of wells 220 are formed into the inner surface 206 of second mold part 174. The wells 220 are sized to accommodate the fastener receiving structures 86 of glazing 16 and are formed about the periphery and are aligned to admit a corresponding plurality of fastener receiving structures 86 spaced about the periphery of the glazing 16.

The first mold part 172 cooperates with the second mold part 174 to define mold cavity 224. More specifically, when first mold part 172 is oriented with respect to second mold part 174, planar inner surfaces 192 of first mold part 172 and 212 of second mold part 174 engage each other on the fabric side and inner surfaces 196 of first mold part 172 and 216 of second mold part 174 sandwich glazing panel central portion 51 therebetween.

The injection gates 186 in first mold part 172, provide a means to inject molding material into mold cavity 224, thereby forming frame member 20. It can be appreciated that a number of injection gates may extend into mold cavity 224 around the periphery of first mold part 172 and/or second mold part 174 in order to ensure that frame member 20 is solidly and completely formed.

Frame member 20 is preferably formed by injection molding in the same manner as frame member 100 using any suitable thermoplastic material. The glazing 16, is inserted into the second mold part 174 such that the fastener receiving structures 86 are placed into the wells 220 and ensuring the glazing inner surface lays flat against the inner surface 206 of second mold part 174. First mold part 172 is then placed onto second mold part 174 and the resin material 170 is injected through injection gates 186 into the cavity therebetween, thus forming frame member 20. The molten material adheres to the glazing 16 creating a bond line 80 between the first frame member 20 and the glazing 16 at the planar surface 25 and inner edge 24.

It thus will be seen that the objects of this invention have been fully and effectively accomplished. It will be realized, however, that the foregoing preferred embodiments of the present invention have been shown and described for the purposes of illustrating the structural and functional principles of the present invention and is subject to change without departure from such principles.

What is claimed is:

1. A backlight assembly for a convertible roof of a vehicle, said assembly comprising:
    a fabric roof cover having a backlight opening formed therein and a plurality of apertures formed therein about a periphery of said backlight opening;
    a glazing disposed in said backlight opening, said glazing having a flange extending about a periphery of said glazing and overlapping a portion of said fabric roof cover, said flange having a plurality of fastener-receiving structures, each of which are received within a corresponding one of said plurality of apertures;
    a first frame member extending about the periphery of the glazing and overlapping the flange and sealingly engaging said roof cover;
    a second frame member extending about the periphery of the glazing and overlapping the flange, said second frame member disposed opposite said first frame member with the flange and said roof cover disposed therebetween; said second frame member having a plurality of fasteners, each interlocking with a corresponding one of the fastener-receiving structures to fasten said second frame member to the flange to thereby secure said glazing to said roof cover.

2. The backlight assembly of claim 1, wherein said first frame member is molded directly onto said glazing.

3. The backlight assembly of claim 2, wherein said second frame member further includes a knife-edge structure extending towards the flange to press said roof cover against said flange.

4. The backlight assembly of claim 3, wherein said first frame member has a sealant groove and sealant material disposed therein to provide said sealing engagement between said first frame member and said roof cover.

5. The backlight assembly of claim 4, wherein said first frame member has a flexible lip formed along a peripheral edge, said flexible lip biased to press against said roof cover when said second frame member is fastened to said glazing by said fasteners.

6. The backlight assembly of claim 5, wherein said second frame member includes a plurality of openings generally aligned with said fastener-receiving structures for nested engagement between the second frame member and the flange.

7. The backlight assembly of claim 6, wherein said fasteners extend through said plurality of openings to snappingly engage the fastener-receiving structure.

8. The backlight assembly of claim 7, wherein said first and second frame members are formed from a polycarbonate blend selected from a group including ASA and PMMA.

9. The backlight assembly of claim 1, wherein said second frame member is molded directly onto said roof cover.

10. The backlight assembly of claim 9, wherein said first frame member has a sealant groove and sealant material disposed therein to provide said sealing engagement between said first frame member and said roof cover.

11. The backlight assembly of claim 10, wherein said first frame member has a flexible lip formed along a peripheral edge, said flexible lip biased to press against said roof cover when said second frame member is fastened to said glazing by said fasteners.

12. The backlight assembly of claim 11 wherein said second frame member includes a plurality of openings generally aligned with said fastener-receiving structures for nested engagement between the second frame member and the flange.

13. The backlight assembly of claim 12, wherein said fasteners extend through said plurality of openings to snappingly engage the fastener-receiving structure.

14. The backlight assembly of claim 13, wherein said first and second frame members are formed from a polycarbonate blend selected from a group including ASA and PMMA.

15. A method for securing a backlight glazing into a backlight opening formed in a roof cover of a convertible roof of a vehicle, said method comprising:

providing a roof cover with a backlight opening and a plurality of apertures extending about a periphery of said backlight opening;

providing a glazing having a plurality of fastener-receiving structures formed about a flange extending from a periphery of said glazing, said plurality of fastener-receiving structures being constructed and arranged to permit each of the fastener-receiving structures to be received within a corresponding one of the apertures formed about the periphery of said backlight opening when the glazing is inserted in the backlight opening;

forming a first frame member secured to the periphery of the glazing and overlapping the flange by placing the periphery and flange of the glazing into a cavity of a mold assembly and injecting flowable molding material into the cavity and permitting the molding material to be molded directly to the periphery and flange of the glazing;

positioning the glazing and the first frame member with respect to the backlight opening so that each of the fastener-receiving structures is received within a corresponding one of the apertures, said flange overlapping a portion of the roof cover;

providing a second frame member and positioning the second frame member opposite the first frame member with the overlapping portions of the flange and the roof cover disposed between the first and second frame members and fastening the second frame member to the fastener-receiving structures, sandwiching the roof cover between the flange and the second frame member thereby securing the glazing to the roof cover.

16. The method of claim 15 wherein the second frame member is provided by forming the second frame member secured to the roof cover about the periphery of the backlight opening by placing the roof cover into a second mold assembly defining a molding cavity and injecting flowable molding material into the molding cavity and permitting the molding material to mold directly to the roof cover.

17. The method of claim 16, wherein said first frame member is molded from a thermoplastic material.

18. The method of claim 17, wherein said second frame member is molded from a thermoplastic material.

\* \* \* \* \*